Feb. 8, 1938.   H. F. HEFFNER ET AL   2,107,893
SLED BRAKE
Filed June 29, 1936
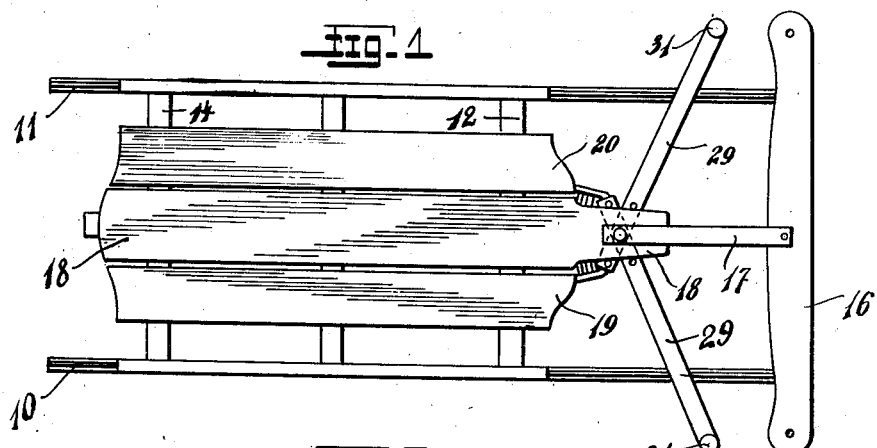
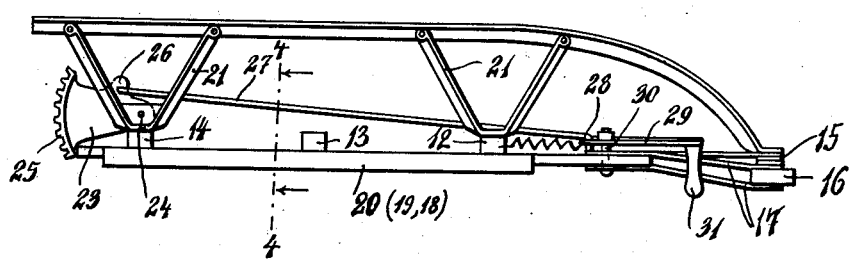
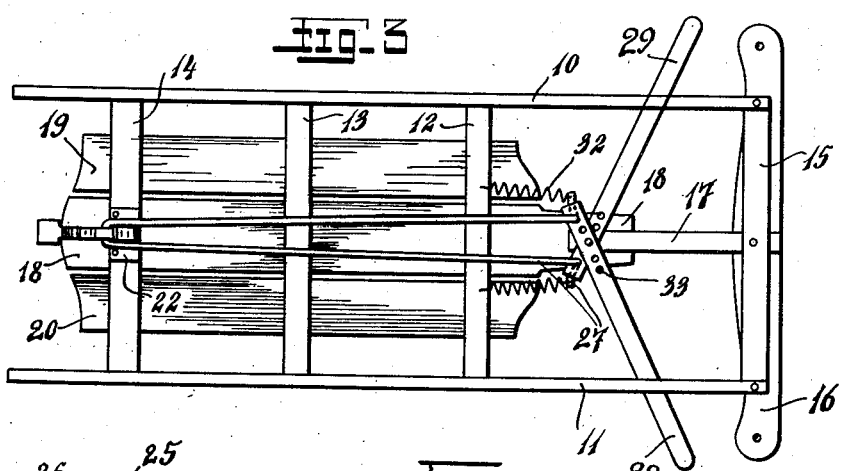
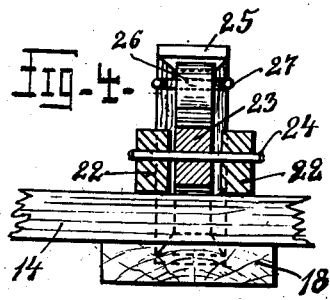
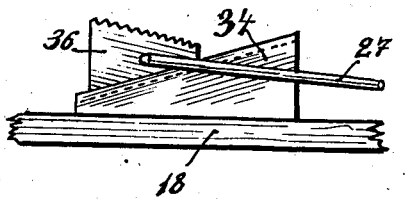
INVENTORS:
Harry F. Heffner
Lewis L. DeTurk
by: Herman Fischer
ATTORNEY.

Patented Feb. 8, 1938

2,107,893

UNITED STATES PATENT OFFICE 2,107,893

SLED BRAKE

Harry F. Heffner and Lewis L. De Turk, Kearny, N. J.

Application June 29, 1936, Serial No. 87,900

3 Claims. (Cl. 188—8)

The subject of this invention is a braking device for a sled, to slow up and completely stop the momentum of the sled which is particularly useful in coasting around corners or down hills.

The essential feature of this new device is a brake forming member, provided movably on the lower side of the rear part of the sled platform, which member is to be operated by a lever provided at the front part of the platform. The brake forming member itself may be shaped either as a swingable and preferably spirally arcuate segment, or as a wedge, which is shiftable longitudinally along a wedgeshaped fixed base.

In order to make clear the invention there is shown in the drawing a preferred embodiment of the whole device and further a variation of the brake forming member of the same.

In the drawing Figure 1 is a top plan view of a sled with the new braking device mounted on it;

Figure 2 is an inverted side elevational view of the sled and braking device;

Figure 3 is a bottom plan view of the sled, showing the new braking device installed thereon;

Figure 4 is a cross sectional view of the braking device, seen in the direction of the arrows from the line 4—4 in Fig. 2.

Figure 5 is a variation of the brake forming parts.

Referring now more in detail to the drawing the numerals 10 and 11 indicate the runners of the sled. These runners are connected to each other indirectly by being mounted on angular frames 21. A transverse brace 15 is secured to the forward end of the runners, whereas the frames 21 are fixed to the cross bars 12 and 14. A cross beam 16 is pivotally mounted on the brace 15, and is also connected, by means of a strap 17, to the central member 18 of the platform of the sled, which platform is mounted upon the bars 12, 13, and 14, and comprises three members, the previously mentioned member 18 and the side members 19 and 20. The braking mechanism is located between the platform and the runners.

Depending from the rear bar 14 is a pair of brackets 22, spaced apart from each other, and an arcuate segment 23 is pivotally mounted between the brackets upon a pin 24. The outer rim 25 of the segment is provided with teethlike indentation or bulges, which are to contact the track surface, when the brake is manipulated.

A lug 26, projecting on the side of the segment, has a hole, into which a connecting rod is inserted. The connecting rod 27 is of a U-shape, as shown in Fig. 3. The two legs of the U-shaped rod 27 extend forward and are connected at their forward ends to corresponding openings 33 in the operating levers 29. The operating levers 29 are crossed and pivoted by means of a bolt 30. One end of each lever thus has a grip handle 31, whereas the opposite end 28 forms the working end of said operating lever 29. It will be noted, that each lever 29 is provided with a plurality of openings 33, either one of which may be fixed over the bolt 30, and thus adjustment of the leverage proportion of said lever becomes possible. The end of the rod 27, which passes through the lever end 28, has one end of a coil spring 32 secured thereto, the opposite end of which coil spring is secured to the rigid bar 12 of the sled. When the grip handle 31 is pulled rearwardly, the rod 27 is pulled forwardly, which movement swings the segment 23 to a lower position, in which the teeth contact with the track surface and break the momentum of the sled. If the sled rider lets go the grip handles, then the springs 32 pull the rod 27 backwardly, which movement lifts the brake 23 up from the track.

It is evident, that certain changes in form and construction may be made, without departing from the spirit and scope of the invention. A variation of the braking element is shown in the Figure 5, according to which the central member 18 of the sled platform carries a wedge shaped block 34 with a guideway 35 on its slanting surface; along this guideway may slide the conical block 36, which is provided opposite to its base with indentation or bulges, as in the previous example. The longitudinal movement of the rod 27' shifts the brake forming block 36 into contact with the track or away from the track.

We claim:

1. In combination with a sled having runners and an elevated platform, of braking apparatus comprising a gripper movably mounted at the rear underside of the platform and adapted to be moved into or out of contact with the track surface, a pair of laterally extended brake handles, said handles being crossed at a common pivot connection whereby they are operatively attached to the platform to form operating levers, a U-shaped rod pivotally associated with the gripper, the legs of said U-shaped rod extending forward for connection to the operating levers so that movement of the handles in a rearward direction exerts a forward pull on the U-shaped rod to move the gripper into engagement with the track surface, and coil springs connected between the inner ends of the operating levers and the platform for normally urging the connecting rod to a brake release rearward position whereby the gripper is moved out of contact with the track surface.

2. In combination with a sled having runners and an elevated platform, of braking apparatus comprising a gripper movably mounted at the rear underside of the platform and adapted to be moved into or out of contact with the track surface, laterally extended brake handles comprising a pair of crossed operating levers having a common pivot and being provided with a plurality of holes so as to adjust the operating ratio of said levers about said common point, a U-shaped rod pivotally associated with the gripper, the legs of said U-shaped rod extending forward for connection to the operating levers so that movement of the handles in a rearward direction exerts a forward pull on the U-shaped rod to move the gripper into engagement with the track surface, and coil springs connected between the inner ends of the operating levers and the platform for normally urging the connecting rod to a brake release rearward position whereby the gripper is moved out of contact with the track surface.

3. In combination with a sled having runners and an elevated platform, of braking mechanism including an inclined block fixed on the rear underside of the platform, a guideway in the inclined surface of said block, a wedge-shaped gripper slidably movable along the guideway of the fixed block so as to move into or out of engagement with the track surface, operating means for shifting the slidable block along the fixed block into operative braking position, and means for normally urging the slidable block along the fixed block into a brake releasing position.

HARRY F. HEFFNER.
LEWIS L. DE TURK.